US005820290A

United States Patent [19]

Galindo

[11] Patent Number: 5,820,290

[45] Date of Patent: Oct. 13, 1998

[54] DOOR HANDLE/KNOB ASSEMBLY HAVING A WOBBLE CONTROL RING

[75] Inventor: Jaime Galindo, Reno, Nev.

[73] Assignee: Schlage Lock Company, San Francisco, Calif.

[21] Appl. No.: 780,950

[22] Filed: Jan. 10, 1997

[51] Int. Cl.[6] .................... B25G 3/20; F16B 2/24

[52] U.S. Cl. .................... 403/327; 403/379; 16/DIG. 6; 272/DIG. 73

[58] Field of Search .................... 403/329, 327, 403/326, 379; 16/121, DIG. 6; 292/348, DIG. 73; 384/273, 903, 626, 627

[56] References Cited

U.S. PATENT DOCUMENTS

| | | | |
|---|---|---|---|
| 255,858 | 4/1882 | Hidden | 403/329 X |
| 1,245,939 | 11/1917 | Mallatt | 403/326 X |
| 1,446,587 | 2/1923 | Russell | 292/384 |
| 1,488,014 | 3/1924 | McDonald | 403/329 X |
| 1,519,503 | 12/1924 | Norwood et al. | 292/384 X |
| 1,882,625 | 10/1932 | Jacobi | 403/326 X |
| 2,675,256 | 4/1954 | Cornell | 403/379 |
| 3,214,204 | 10/1965 | Carter . | |
| 3,233,497 | 2/1966 | McCormick . | |
| 3,449,934 | 6/1969 | Check . | |
| 3,483,789 | 12/1969 | Wurzel . | |
| 3,548,621 | 12/1970 | Rossetti . | |
| 3,853,416 | 12/1974 | Hanan | 403/329 X |
| 3,923,408 | 12/1975 | Belsdorf . | |
| 4,019,824 | 4/1977 | Percy . | |
| 4,151,779 | 5/1979 | Timmer | 389/903 X |
| 4,236,767 | 12/1980 | Feldle | 384/903 X |
| 4,607,539 | 8/1986 | Arima et al. . | |
| 5,251,467 | 10/1993 | Anderson . | |

*Primary Examiner*—Anthony Knight

*Attorney, Agent, or Firm*—Michael H. Minns; Robert F. Palermo

[57] ABSTRACT

A door handle/knob assembly a door handle/knob assembly includes a housing having an opening formed within the housing, and a shaft received within the opening of the housing. The shaft has an outer surface, a rib for axially retaining the shaft to a lip of the housing in one direction, and a pair of generally oppositely positioned recess formations formed in the outer surface of the shaft. The recess formations are generally adjacent the intersection of the housing and the shaft. A door handle is secured to the shaft, the door handle having a handle member that tapers to a reduced neck portion. The reduced neck portion is fixedly secured to the shaft and has an end which is positioned adjacent the recess formations on a side opposite the housing so as to define a space between the end of the reduced neck portion and the housing. The recessed formations of the shaft are exposed within the space. A retaining ring is disposed between the door handle and housing to prevent the door handle and shaft from wobbling with respect to the housing. The retaining ring applies a force on the housing and reduced neck portion of the door handle for preventing any axial movement and wobble from occurring between the housing and door handle.

5 Claims, 3 Drawing Sheets

DOOR HANDLE/KNOB ASSEMBLY HAVING A WOBBLE CONTROL RING

BACKGROUND OF THE INVENTION

This invention relates generally to door handle/knob assemblies, and more particularly to a door knob assembly having a retaining ring for preventing a door knob and shaft of the assembly from wobbling with respect to a housing mounted on the door.

In the art of door handle/knob assemblies, a hollow shaft is rotatably mounted within a door preparation in the well-known fashion by a housing attached to the door by screw fasteners. A door handle, and typically, a door knob, is mounted on the shaft by any of several mounting techniques. In one known mounting technique, the door knob has a cylindrical, reduced neck portion which is slidably received over the shaft. The shaft has a radially projecting pin which is spring biased outwardly beyond the outer surface of the shaft. The pin is retracted by pressing it inwardly. The shaft receives the cylindrical portion of the door knob thereover, the cylindrical portion having an aperture formed therein which is sized to receive the pin of the shaft therethrough. The arrangement is such that by pressing the pin inwardly to its retracted position, sliding the cylindrical portion of the door knob over the pin, and aligning the aperture with the pin, the pin can extend through the aperture for axially and rotatably locking the door knob to the shaft.

It should be noted that the door knob can also be secured to the shaft by mechanically pinning the cylindrical portion to the shaft. For example, perforations formed in the reduced neck portion of the door knob can be bent inwardly into openings formed in the shaft. This also axially locks the door knob to the shaft while enabling the shaft to rotate when rotating the door knob.

Once secured to the shaft, the door knob and shaft are rotatably mounted within an opening formed in the housing. In typical door assembly constructions there is a certain amount of wobble between the door knob and shaft and the housing. This wobble is attributable to tolerances between the shaft and the opening of the housing, and the axial space between the housing and the door knob. There is presently a need in the door handle/knob assembly art for an assembly that prevents the handle or knob from wobbling.

The foregoing illustrates limitations known to exist in present handle/door knob designs. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a door handle/knob assembly a door handle/knob assembly comprising a housing having an opening formed therein, and a shaft received within the opening of the housing. The shaft has an outer surface, means for axially retaining the shaft to the housing in one direction thereof, and a pair of generally oppositely positioned recess formations formed in the outer surface of the shaft. The recess formations are located generally adjacent the intersection of the housing and the shaft. A door handle is secured to the shaft, the door handle having a handle member that tapers to a reduced neck portion. The reduced neck portion is fixedly secured to the shaft and has an end which is positioned adjacent the recess formations on a side opposite the housing so as to define a space between the housing and the reduced neck portion of the door handle. The recessed formations of the shaft are exposed within the space. Wobble preventing means of the present invention prevents the door handle and shaft from wobbling with respect to the housing. The wobble preventing means is disposed within the space between the housing and the reduced neck portion of the door handle and applies a force on the housing and reduced neck portion of the door handle for preventing any axial movement and wobble from occurring between the housing and door handle.

More particularly, the wobble preventing means comprises a retaining ring having a generally C-shaped body with a pair of free ends each of which is formed with an inwardly projecting detent. The retaining ring, when releasably mounting the retaining ring on the shaft, is received on the outer surface of the shaft within the space with the detents being received in the recess formations of the shaft and the C-shaped body engaging the housing and the reduced neck portion of the door handle. Each detent has a cross section with a tapered portion and a reduced width portion, the tapered portion of the detent being adapted to engage the recess formation when mounting the retaining ring on the shaft for accommodating varying distances between housing and door handle.

Accordingly, among the several objects of the present invention are the provision of a new wobble control retaining ring which prevents a door handle/knob mounted on a shaft from wobbling with respect to a housing on which the shaft is rotatably mounted; the provision of a new retaining ring which, when mounted on a door handle or knob, has a neat, clean and attractive appearance; the provision of a new retaining ring which can accommodate door knobs of varying constructions; the provision of a new retaining ring which can be easily manufactured and installed; and the provision of a new retaining ring which is simple in design and sturdy in construction.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
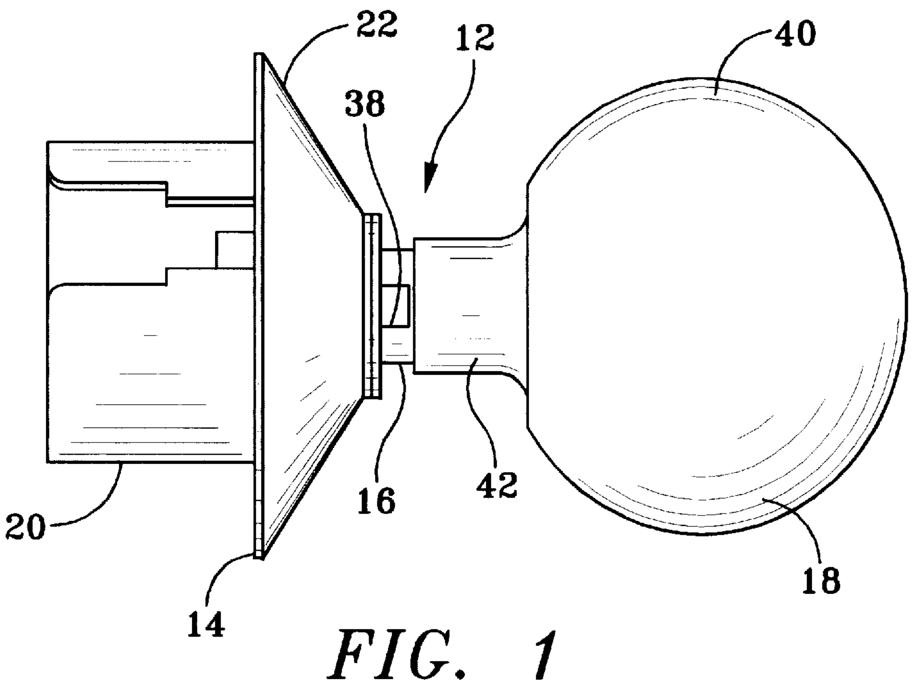
FIG. 1 is a side elevational view of a door handle assembly.

Referring now to the drawings, wherein similar reference characters designate corresponding parts throughout the several views, there is generally indicated at 10 a wobble control retaining ring of the present invention. The retaining ring is designed to be used as part of a door handle/knob assembly, generally indicated at 12. As shown, the assembly 12 includes a housing 14 fixedly mounted on a door (not shown) by suitable fasteners, e.g., screw fasteners (also not shown), within a door preparation (further not shown). The assembly 12 further includes a shaft 16 which extends through the housing, and a door handle/knob 18 which is fixedly secured to the shaft 16. The retaining ring 10 of the present invention prevents the shaft 16 and door handle/knob 18 from wobbling with respect to the housing 14 after they are rotatably attached to the housing 14. As will be discussed in greater detail below, the retaining ring 10 is designed to accommodate door handles and door knobs of different designs.

Figure 2:
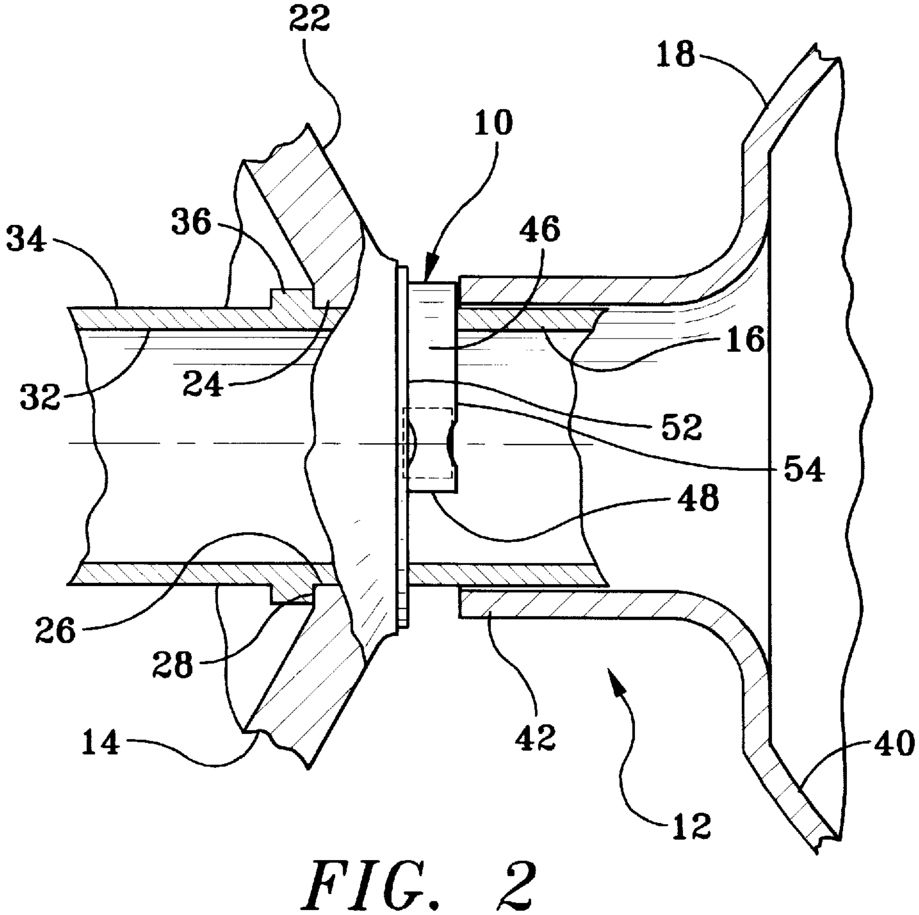
FIG. 2 is a partial cross-sectional, side elevational view of the door handle assembly illustrating a wobble control retaining ring of the present invention.

Referring to FIGS. 1 and 2, the housing 14 has a tubular portion 20 (see FIG. 1), and a flange portion 22 (see FIG. 2) which terminates at one end (e.g., the right-hand end in the drawings) to define an inwardly projecting, annular lip 24. The flange portion 22, in the shown embodiment, tapers inwardly to form the lip 24. This lip 24 of the flange portion 22 of the housing 14 has a first surface 26, which when mounting the door handle/knob 18 on the shaft 16, engages the shaft 16. The lip 24 further has a second surface 28 and a third surface 30 which are generally perpendicular to the first surface 26 and face outwardly in opposite directions with respect to one another. The second surface 28, when rotatably mounting the door shaft 16 on the housing 14, axially engages the shaft 16 in a manner to be described in greater detail below for axially retaining the shaft 16 in one direction.

As shown, the shaft 16 includes a cylindrically-shaped wall 32 having an outer surface 34, a circumferential raised rib 36 formed on the outer surface 34, and a pair of generally oppositely positioned recess formations, each indicated at 38, also formed in the outer surface 34 of wall 32. The outer surface 34 is engaged by the first surface 26 of the lip 24 when rotatably securing the shaft 16 to the housing 14. The circumferential raised rib 36 can be in the form of one continuous rib or a series of spaced-apart, aligned ribs and still fall within the spirit and scope of the present invention. In the case of a cylindrical shaft 16 having a relatively thin wall 32, the recess formations 38 can embody an aperture created in the wall 32 of the shaft 16. However, the recess formations 38 can also embody cavities formed in the wall 32 of the shaft 16 as well. Each recess formation 38 is rectangularly-shaped, and is spaced inwardly (with respect to the door handle/knob 18 as illustrated in the drawings) a predetermined distance depending upon the thickness of the lip 24 of the housing 14 when it is engaged with the rib 36. As shown, the rib 36 engages the second surface 28 of the lip 24 of the housing 14 for preventing axial movement in one direction therebetween.

The door handle/knob 18 has a handle member 40. In the shown embodiment, the handle member 40 is a door knob, the major portion of which is not shown in the drawings. The handle member 40 tapers inwardly to a reduced neck portion 42 having an inner diameter slightly greater than the outer diameter of the shaft 16. The arrangement is such that the reduced neck portion 42 is slid over the shaft 16 in the manner illustrated in FIGS. 1 and 2 to a point just before the recessed formations 38, and secured thereto by any suitable means, such as by retractable pins, mechanical fastening, or the like. The door handle/knob 18 is secured to the shaft 16 in the above manner after the shaft 16 is inserted through the opening defined by the first surface 26 of the annular lip 24 of the housing 14 to a position where the rib 36 of the shaft 16 engages the lip 24 of the housing 14.

In this position, the shaft 16 and door handle/knob 18 are rotatably secured to the housing 14. The door handle/knob 18 and the shaft 16 illustrated in FIG. 1, without the aid of the retaining ring 10, wobbles with respect to the housing 14. This wobbling effect is attributable to the clearance between the opening defined by the lip 24 and the outer surface 34 of the shaft 16, and to the distance between the reduced neck portion 42 of the door handle/knob 18 and the lip 24 of the housing 14.

The shaft 16 and door handle/knob 18 are fabricated from any suitable material, e.g., brass or stainless steel, and are constructed and assembled in the well-known fashion. As noted above, the principles of the present invention apply to any type door handle/knob construction, so long as the shaft 16 having the door handle/knob 18 is rotatably mounted within the housing 14.

Turning now to FIGS. 2–7, the retaining ring 10 of the present invention is designed to lock the door handle/knob 18 in place and actually axially lock it and the shaft 16 to the housing 14. The retaining ring 10 comprises a generally C-shaped body 46 (see FIG. 7) having a pair of free ends, each indicated at 48. As shown, each free end 48 turns inwardly to form an inwardly projecting detent 50 which is received within its respective recess formation 38 when attaching the retaining ring 10 on the shaft 16. More specifically, the body 46 of the retaining ring 10 engages the outer surface 34 of the shaft 16 with the detents 50 being received in the recess formations 38 of the shaft 16. In this position, a first side 52 of the C-shaped body 46 engages the third surface 30 of the lip 24 thereby clamping the lip 24 between the rib 36 and the retaining ring 10. The other, second side 54 of the body 46 of the retaining ring 10 engages the reduced neck portion 42 of the door handle/knob 18 for preventing any axial movement of the shaft 16 with respect to the housing 14. Once the detents 50 of the retaining ring 10 are secured in their respective recess formations 38, the retaining ring 10 is axially locked on the shaft 16 thereby axially locking the door handle/knob 18 and the shaft 16 with respect to the housing 14.

The body of the retaining ring 10 is bent so as to bias the detents 50 inwardly when securing the retaining ring 10 to the shaft 16. This construction enables the body 46 and detents 50 to clasp onto the shaft 16 thereby reducing the likelihood that the retaining ring 10 will become disassociated (e.g., "pop off") therefrom.

Figure 3:
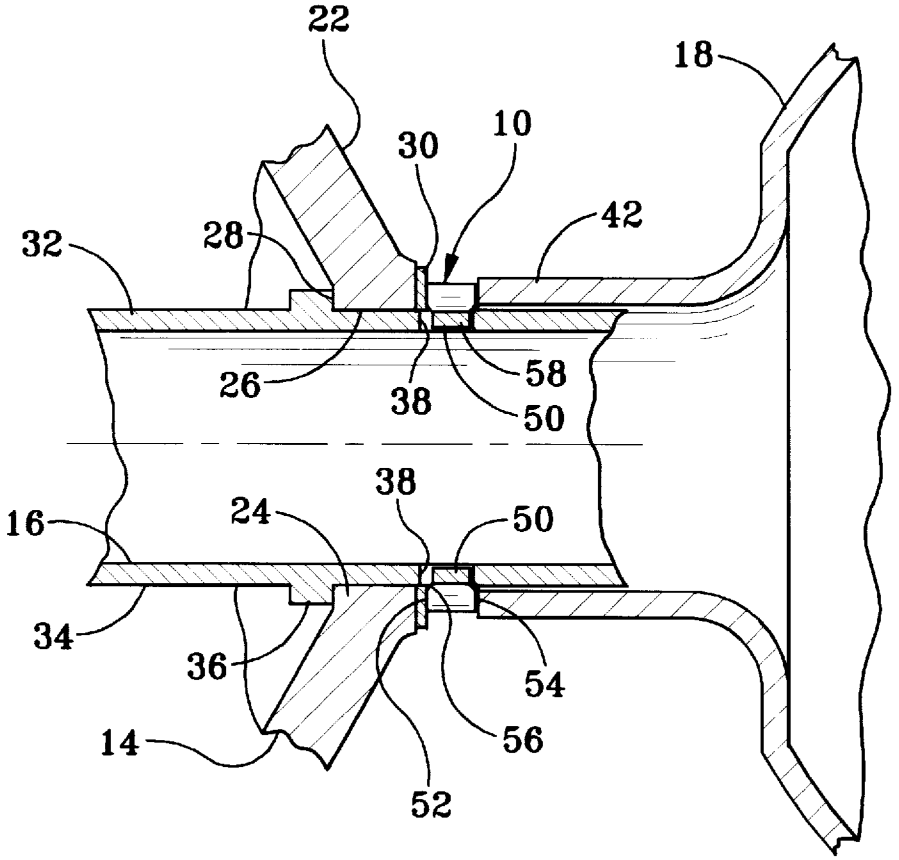
FIG. 3 is a partial cross-sectional, top plan view of the door handle assembly and the retaining ring.
Figure 4:
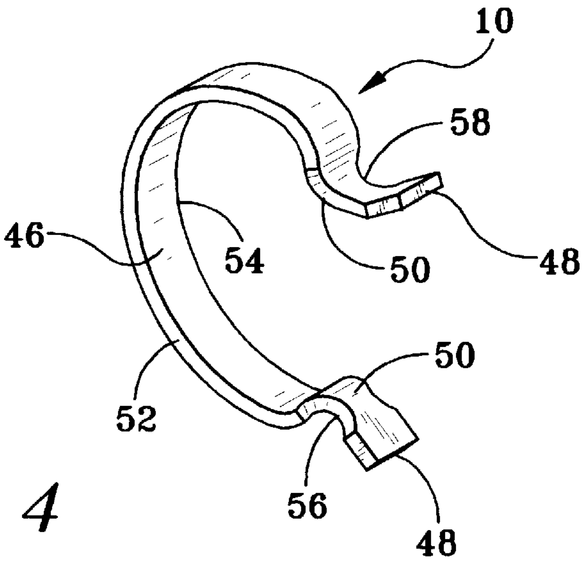
FIG. 4 is a perspective view of the retaining ring.
Figure 5:
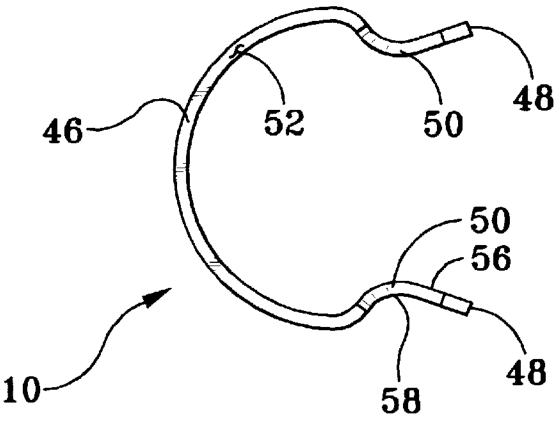
FIG. 5 is a front elevational view thereof.
Figure 6:
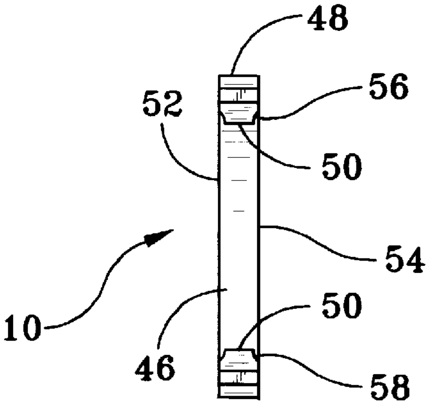
FIG. 6 is a side elevational view thereof.
Figure 7:
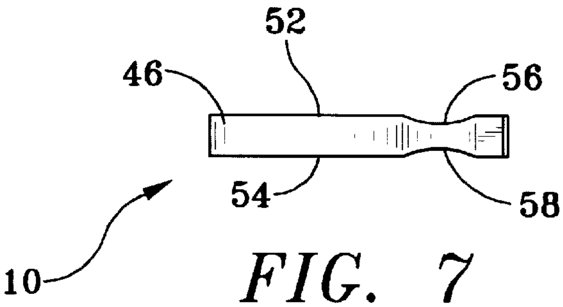
FIG. 7 is a top plan view thereof.

Referring to FIGS. 3 and 6, each detent 50 has a cross-section with a tapered portion 56 and a reduced width portion 58. The tapered portion 56 of the detent 50 is designed so that it engages the edge of the recess formation 38 when mounting the retaining ring 10 on the shaft 16. The purpose of this construction is for accommodating recessed formations 38 having varying widths. The arrangement is such that, for each detent 50, the tapered portion 56 rides on the edge of the recess formation 38 depending upon the lateral position of the retaining ring 10. The reduced width portion 58 of each detent 50 has a width less than the width of the recess formation 38 so that the detent 50 can move slightly laterally within the recess formation 38 thereby enabling the retaining ring 10 to accommodate recess formations of varying widths.

Additionally, the body 46 of the retaining ring 10 has a width (i.e., the distance between first and second sides 52, 54) slightly less than the distance between the lip 24 of the housing 14 and the reduced neck portion 42 of the door handle/knob 18. By providing a plurality of retaining rings having varying widths, the retaining ring 10 of the present invention is suitable for accommodating door handle assemblies having component parts of various shapes and sizes.

Without the aid of the retaining ring 10 of the present invention, the shaft 16 having the door handle/knob 18 mounted thereon has a tendency to wobble with respect to the housing 14. The retaining ring 10 applies a force to the third surface 30 of the lip 24 of the housing 14 and the reduced neck portion 42 of the door handle/knob 18 for axially locking the shaft 16 with respect to the housing 14. This locking force prevents the shaft 16 wobbling with respect to the housing 14. It can be appreciated from the foregoing that the retaining ring 10 is suitable for door handle/knobs having varying distances between the reduced neck portion 42 and the lip 24 of the housing 14. It can therefore be seen that for these reasons, the instant invention is believed to represent a significant advancement in the art which has substantial commercial merit.

While this invention has been illustrated and described in accordance with a preferred embodiment, it is recognized that variations and changes may be made therein without departing from the invention as set forth in the following claims.

Having described the invention, what is claimed is:

1. A door handle/knob assembly comprising:

a housing having an opening formed therein;

a shaft received within the opening of the housing, said shaft having an outer surface, means for axially retaining the shaft to the housing in one direction thereof, and a pair of generally oppositely positioned recess formations formed in the outer surface of the shaft, said recess formations being located generally adjacent the intersection of the housing and the shaft, said recess formations having a width;

a door handle secured to the shaft, the door handle having a handle member that tapers to a reduced neck portion, said reduced neck portion being fixedly secured to the shaft and having an end which is positioned adjacent the recess formations on a side opposite said housing a distance so as to define a space between the end of the reduced neck portion and the housing when rotatably mounting the shaft on the housing, said recessed formations of the shaft being exposed within said space; and wobble preventing means for preventing the door handle and shaft from wobbling with respect to the housing, said wobble preventing means being disposed within said space between the end of the reduced neck portion of the door handle and the housing and for applying a force on the housing and reduced neck portion of the door handle for preventing any axial movement and wobble from occurring between the housing and door handle, the wobble means comprising a ring having a generally C-shaped body with a pair of free ends, the C-shaped body having an inner surface proximate an outer surface of the shaft and having first and second side surfaces extending from the inner surface away from the shaft outer surface, the first side surface engaging the housing and the second side surface engaging the door handle reduced neck portion thereby applying a force on the housing and reduced neck portion of the door handle, each free end of the C-shaped body having an inwardly projecting detent; the ring, when releasably mounting the ring on the shaft, being received on the outer surface of the shaft within said space with the detents being received in the recess formations of the shaft, each detent having a tolerance means for accommodating varying recess formation width, the tolerance means comprising each detent having a cross section with a tapered portion and a reduced width portion, said tapered portion of the detent being adapted to engage the recess formation when mounting the ring on the shaft.

2. A door handle/knob assembly as set forth in claim 1, wherein each end of the C-shaped body having an inwardly projecting detent, the ring, when releasably mounting the ring on the shaft, being received on the outer surface of the shaft within said space with the detents being received in the recess formations of the shaft.

3. A door handle/knob assembly as set forth in claim 1, each detent having a cross section with a reduced width with respect to the body of the ring.

4. A door handle/knob assembly as set forth in claim 2, each detent having a cross section with a tapered portion and a reduced width portion, said tapered portion of the detent being adapted to engage the recess formation when mounting the retaining ring on the shaft for accommodating varying distances between housing and door handle.

5. A door handle/knob assembly as set forth in claim 1, said body of the ring being bent to bias the detents inward.

* * * * *